US012744669B2

(12) United States Patent
Wang

(10) Patent No.: US 12,744,669 B2
(45) Date of Patent: Sep. 22, 2026

(54) MULTI-DEVICE ASSISTIVE IDENTITY VERIFICATION METHOD AND SYSTEM

(71) Applicant: Alipay (Hangzhou) Information Technology Co., Ltd., Hangzhou (CN)

(72) Inventor: Yongtao Wang, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 20 days.

(21) Appl. No.: 18/868,351

(22) PCT Filed: May 26, 2023

(86) PCT No.: PCT/CN2023/096629

§ 371 (c)(1),
(2) Date: Nov. 22, 2024

(87) PCT Pub. No.: WO2023/241337

PCT Pub. Date: Dec. 21, 2023

(65) Prior Publication Data

US 2025/0337579 A1 Oct. 30, 2025

(30) Foreign Application Priority Data

Jun. 13, 2022 (CN) ......................... 202210661230.7

(51) Int. Cl.
*H04L 9/32* (2006.01)

(52) U.S. Cl.
CPC .......... *H04L 9/3213* (2013.01); *H04L 9/3228* (2013.01)

(58) Field of Classification Search
USPC .......................................................... 713/159
See application file for complete search history.

(56) References Cited

U.S. PATENT DOCUMENTS

| | | | | |
|---|---|---|---|---|
| 10,630,682 | B1 | 4/2020 | Bhattacharyya et al. | |
| 10,887,095 | B2 * | 1/2021 | Chopra | H04L 63/0428 |
| 2007/0050845 | A1 | 3/2007 | Das et al. | |
| 2019/0190710 | A1 * | 6/2019 | Chopra | G06F 9/45558 |
| 2019/0305952 | A1 * | 10/2019 | Hamel | H04L 9/0637 |
| 2021/0067340 | A1 * | 3/2021 | Ferenczi | H04L 9/0825 |
| 2021/0217007 | A1 * | 7/2021 | Menon | G06Q 20/4014 |

(Continued)

FOREIGN PATENT DOCUMENTS

| | | | |
|---|---|---|---|
| CN | 103065240 | A | 4/2013 |
| CN | 104680372 | A | 6/2015 |
| CN | 105931421 | A | 9/2016 |

(Continued)

OTHER PUBLICATIONS

"European Search Report" regarding application No. 23822907.4, mailed on Sep. 8, 2025. pp. 1-9.

(Continued)

*Primary Examiner* — Sanchit K Sarker

(57) ABSTRACT

The present disclosure provides a multi-device assistive identity verification method and system. The method includes: receiving an identity key allocation request and an identity key sharing request of a user; and allocating and storing an identity key, and sending the identity key to the user and a sharer. The method further includes: when a transaction request of the user is received, inviting the user and the sharer to assist in confirmation, and comparing tokens to perform identity verification.

13 Claims, 6 Drawing Sheets

(56) References Cited

U.S. PATENT DOCUMENTS

2022/0360448 A1* 11/2022 Sahni .................. H04L 63/0846

FOREIGN PATENT DOCUMENTS

| | | | |
|---|---|---|---|
| CN | 107623681 | A | 1/2018 |
| CN | 108960815 | A | 12/2018 |
| CN | 109146489 | A | 1/2019 |
| CN | 109146496 | A | 1/2019 |
| CN | 109155029 | A | 1/2019 |
| CN | 109479049 | A | 3/2019 |
| CN | 110084612 | A | 8/2019 |
| CN | 110995642 | A | 4/2020 |
| CN | 111047740 | A | 4/2020 |
| CN | 112398645 | A | 2/2021 |
| CN | 113011891 | A | 6/2021 |
| CN | 115150093 | A | 10/2022 |
| WO | 2020051710 | A1 | 3/2020 |

OTHER PUBLICATIONS

Ozkan Can et al: "Security Analysis of 1-12 Mobile Authenticator Applications", 2020 International Conference on Information Security and Cryptology (ISCTURKEY), IEEE, Dec. 3, 2020 (Dec. 3, 2020), pp. 18-30, XP033899457, DOI: 10.1109/ISCTURKEY51113.2020.9308020 [retrieved on Dec. 24, 2020].

"International Search Report" regarding Intl. Application No. PCT/CN2023/096629, mailed on Jun. 26, 2023, pp. 1-9.

* cited by examiner

MULTI-DEVICE ASSISTIVE IDENTITY VERIFICATION METHOD AND SYSTEM

CROSS-RELATED APPLICATIONS

This specification is a national stage entry of international application no. PCT/CN2023/096629, filed May 26, 2023, which claims priority to Chinese Patent Application No. 202210661230.7, filed with the China National Intellectual Property Administration on Jun. 13, 2022, which is incorporated herein by reference in its entirety.

TECHNICAL FIELD

The present disclosure relates to the field of identity verification, and more specifically, to assistive identity verification.

BACKGROUND

With popularization of mobile devices (for example, a smartphone), regardless of a service, payment, or identity verification, interaction at a mobile terminal develops toward convenient interaction, a fast speed, and a simple operation. From a perspective of only a payment method, in a payment scenario, past long password payment evolves to short password payment, and then to current biometric payment (fingerprint payment, facial payment, 2D facial payment). In a process, good experience and security are always balanced. Currently, although there are sufficiently secure biological products (for example, fingerprint/facial verification, biological face scanning, etc. based on an Internet Finance Authentication Alliance (IFAA)), these products still have a certain security risk (for example, a similar face).

Therefore, it is expected that a multi-device assistive identity verification method can be provided. When a user initiates a service request, an identity verification assistant authorized by the user is requested to simultaneously perform confirmation to complete assistive identity verification. In this way, a potential security risk such as a similar face is avoided based on an identity verification solution in which multi-device assistive interaction is performed, and security and user experience of identity verification are improved.

SUMMARY

Content of the present disclosure is provided, to describe, in a simplified form, some concepts that are to be further described in the following specific implementations. The content of the present disclosure is neither intended to identify key features or necessary features of the claimed subject matter, nor intended to help determine the scope of the claimed subject matter.

In view of the above-mentioned problem, according to an aspect of the present disclosure, a multi-device assistive identity verification method is provided. The method includes: receiving an identity key allocation request and an identity key sharing request of a user; allocating an identity key, and storing the identity key in a server; sending the identity key to the user and a sharer; receiving a transaction request of the user, and inviting, based on the transaction request, the user and the sharer to send confirmation; verifying an identity key of the user and an identity key of the sharer in response to the confirmation of the user and the sharer; and returning an identity verification result based on verification of the identity key of the user and the identity key of the sharer.

In the technical solutions in this embodiment of the present disclosure, the identity key is allocated to the user, and the allocated identity key is shared with a sharer authorized by the user. In addition, when the user makes the transaction request, the user and the sharer are invited to perform identity confirmation, to implement assistive identity verification. In this way, a potential security risk such as a similar face is avoided based on an identity verification solution in which multi-device assistive interaction is performed, and security and user experience of identity verification are improved.

According to a further embodiment of the present disclosure, the allocated identity key is stored on a blockchain in an encrypted manner.

According to a further embodiment of the present disclosure, the allocated identity key is bound to a user identifier and a device identifier of the user and a user identifier and a device identifier of the sharer, to form a contract.

According to a further embodiment of the present disclosure, inviting, based on the transaction request, the user and the sharer to send confirmation further includes: obtaining a corresponding identity key from the blockchain based on the transaction request and the user identifier and the device identifier of the user; and inviting the user and the sharer bound to the obtained identity key to send the confirmation.

According to a further embodiment of the present disclosure, verifying the identity key of the user and the identity key of the sharer further includes: separately calculating a token of the user and a token of the sharer, and comparing the token of the user and the token of the sharer; obtaining, based on a comparison result indicating that the token of the user and the token of the sharer are the same, a token calculated in the server; and further comparing the token of the user and the token obtained from the server.

According to a further embodiment of the present disclosure, the token calculated in the server is calculated in the server based on an identity key obtained from a blockchain.

According to a further embodiment of the present disclosure, the token is calculated based on a time-based one-time password (TOTP) algorithm and based on the identity key and a current timestamp.

According to a further embodiment of the present disclosure, the method further includes: in response to that the transaction request of the user is received, performing password verification, SMS message verification, or biometric verification before inviting the user and the sharer to send confirmation.

According to another aspect of the present disclosure, a multi-device assistive identity verification system is provided. The system includes: a key allocation module, configured to: receive an identity key allocation request and an identity key sharing request of a user; allocate an identity key, and store the identity key in a server; and send the identity key to the user and a sharer; an assistive confirmation module, configured to: receive a transaction request of the user, and invite, based on the transaction request, the user and the sharer to send confirmation; and an identity verification module, configured to: verify an identity key of the user and an identity key of the sharer in response to the confirmation of the user and the sharer; and return an identity verification result based on verification of the identity key of the user and the identity key of the sharer.

In the technical solutions in this embodiment of the present disclosure, according to the multi-device assistive identity verification system, when the user makes a service request, an identity verification assistant authorized by the user can be requested to simultaneously perform confirmation to complete assistive identity verification. In this way, security and user experience of identity verification are improved.

According to a further embodiment of the present disclosure, the key allocation module stores the allocated identity key on a blockchain in an encrypted manner.

According to a further embodiment of the present disclosure, the key allocation module binds the allocated identity key to a user identifier and a device identifier of the user and a user identifier and a device identifier of the sharer, to form a contract.

According to a further embodiment of the present disclosure, inviting, based on the transaction request, the user and the sharer to send confirmation further includes: obtaining a corresponding identity key from the blockchain based on the transaction request and the user identifier and the device identifier of the user; and inviting the user and the sharer bound to the obtained identity key to send the confirmation.

According to a further embodiment of the present disclosure, verifying the identity key of the user and the identity key of the sharer further includes: separately calculating a token of the user and a token of the sharer, and comparing the token of the user and the token of the sharer; obtaining, based on a comparison result indicating that the token of the user and the token of the sharer are the same, a token calculated in the server; and further comparing the token of the user and the token obtained from the server.

According to a further embodiment of the present disclosure, the token calculated in the server is calculated in the server based on an identity key obtained from a blockchain.

According to a further embodiment of the present disclosure, the token is calculated based on a time-based one-time password (TOTP) algorithm and based on the identity key and a current timestamp.

According to a further embodiment of the present disclosure, the assistive confirmation module is further configured to: in response to that the transaction request of the user is received, perform password verification, SMS message verification, or biometric verification before inviting the user and the sharer to send the confirmation.

According to still another aspect of the present disclosure, a computer-readable storage medium storing instructions is provided. When the instructions are executed, a machine is enabled to perform the method in any of the above-mentioned aspects.

These and other features and advantages become clear by reading the following detailed descriptions and with reference to the associated accompanying drawings. It should be understood that the above-mentioned general descriptions and the following detailed descriptions are merely illustrative, and do not limit the aspects that claim protection.

BRIEF DESCRIPTION OF DRAWINGS

To understand in detail the manners used by the above-mentioned features of the present disclosure, references can be made to the embodiments for more specific descriptions of the above-mentioned briefly and generally described content, and some aspects are shown in the accompanying drawings. However, it should be noted that the accompanying drawings show only some typical aspects of the present disclosure, and therefore should not be construed as limiting the scope thereof, because the descriptions can be allowed to have other equivalent aspects.

DESCRIPTION OF EMBODIMENTS

The following describes the present disclosure in detail with reference to the accompanying drawings, and features of the present disclosure are further shown in the following specific descriptions.

At present, more operations can be quickly completed at a mobile phone. Because a face-to-face operation cannot be implemented, a higher requirement for identity verification is imposed, to not only ensure a personal operation, but also avoid a similar face. It can be seen that a current identity verification manner still has a potential security risk.

In addition, there are currently some assistive identity verification manners. However, a currently existing assistive identity verification manner is that, for example, after a password is lost, a friend assists in sending a verification code to complete identity confirmation. However, this manner has limited application scenarios, and is post-initiated. Therefore, there is a problem in user experience and security. To resolve the above-mentioned problem, the present disclosure provides a multi-device assistive identity verification method and system, as further described below with reference to FIG. 1 to FIG. 6.

Figure 1:
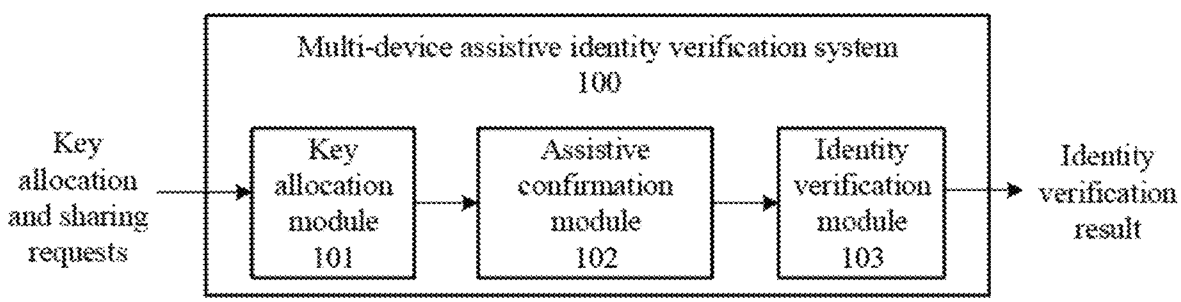
FIG. 1 is a schematic architectural diagram illustrating a multi-device assistive identity verification system, according to an embodiment of the present disclosure.

FIG. 1 is a schematic architectural diagram illustrating a multi-device assistive identity verification system 100, according to an embodiment of the present disclosure. The system 100 can include at least a key allocation module 101, an assistive confirmation module 102, and an identity verification module 103.

The key allocation module 101 can receive an identity key allocation request and an identity key sharing request of a user, allocate an identity key, store the identity key in a server, and send the identity key to the user and a sharer authorized by the user. In an implementation, the key allocation module 101 can bind the allocated identity key to user information and information about the sharer authorized by the user. Specifically, when allocating the identity key, the key allocation module 101 can bind the identity key to a user identifier and a device identifier of the user and a user identifier and a device identifier of the sharer authorized by the user, to form a contract. In an implementation, the key allocation module 101 can store the allocated identity key on a blockchain in an encrypted manner, so that the key is temper-resistant, public, and traceable. A specific identity key registration authorization procedure is described in detail below with reference to FIG. 2.

The assistive confirmation module 102 can receive a transaction request of the user, and invite, based on the transaction request, the user and the sharer authorized by the user to send confirmation. In an implementation, when the identity key of the user is stored on the blockchain, the assistive confirmation module 102 can receive the transaction request of the user, and based on the transaction request, obtain the corresponding identity key from the blockchain based on the user identifier and the device identifier of the user, and invite the user and the sharer bound to the obtained identity key to send identity confirmation. In an implementation, before the user and the sharer are invited to perform the identity confirmation, the assistive confirmation module 102 can further perform identity verification output by a normal service procedure, including but not limited to password verification, SMS message verification, or biological verification. Therefore, in a service occurrence process, the identity key can be synchronously output to perform identity verification, to stop an operation with a potential security risk in a timely manner. In addition, in the service occurrence process, a user holding the identity key can intervene in a current operation in a timely manner. A service can be advanced only after all confirmations are completed. In this way, identity verification security is greatly improved while user experience is improved.

The identity verification module 103 can verify an identity key of the user and an identity key of the sharer in response to the confirmation of the user and the sharer authorized by the user. In an implementation, the identity verification module 103 can separately calculate a token of the user and a token of the sharer, and compare the token of the user and the token of the sharer; obtain, based on a comparison result indicating that the token of the user and the token of the sharer are the same, a token calculated in the server; further compare the token of the user and the token obtained from the server; and return an identity verification result based on a further comparison result. In an implementation, the token is calculated based on a time-based one-time password (TOTP) algorithm and based on the obtained identity key and a current timestamp. The TOTP algorithm is further described in detail in FIG. 4. In an embodiment, when the identity key of the user is stored on the blockchain, the identity verification module 103 can obtain, when the comparison result between the token of the user and the token of the sharer indicates that the token of the user and the token of the sharer are the same, the token calculated in the server. The token is calculated in the server based on the identity key obtained from the blockchain. Therefore, the TOTP algorithm is used to compare the token of the user and the token of the sharer and compare a token of a client and a token of the server, to complete assistive identity verification, thereby further improving identity verification security.

A person skilled in the art can understand that the system and the modules of the system in the present disclosure can be implemented in a hardware form or in a software form, and the modules can be combined in any proper manner. In addition, the system in the present disclosure can be implemented on a smart device, and the smart device can include but is not limited to a smartphone, a mobile phone, a smart watch, or a wearable device.

Figure 2:
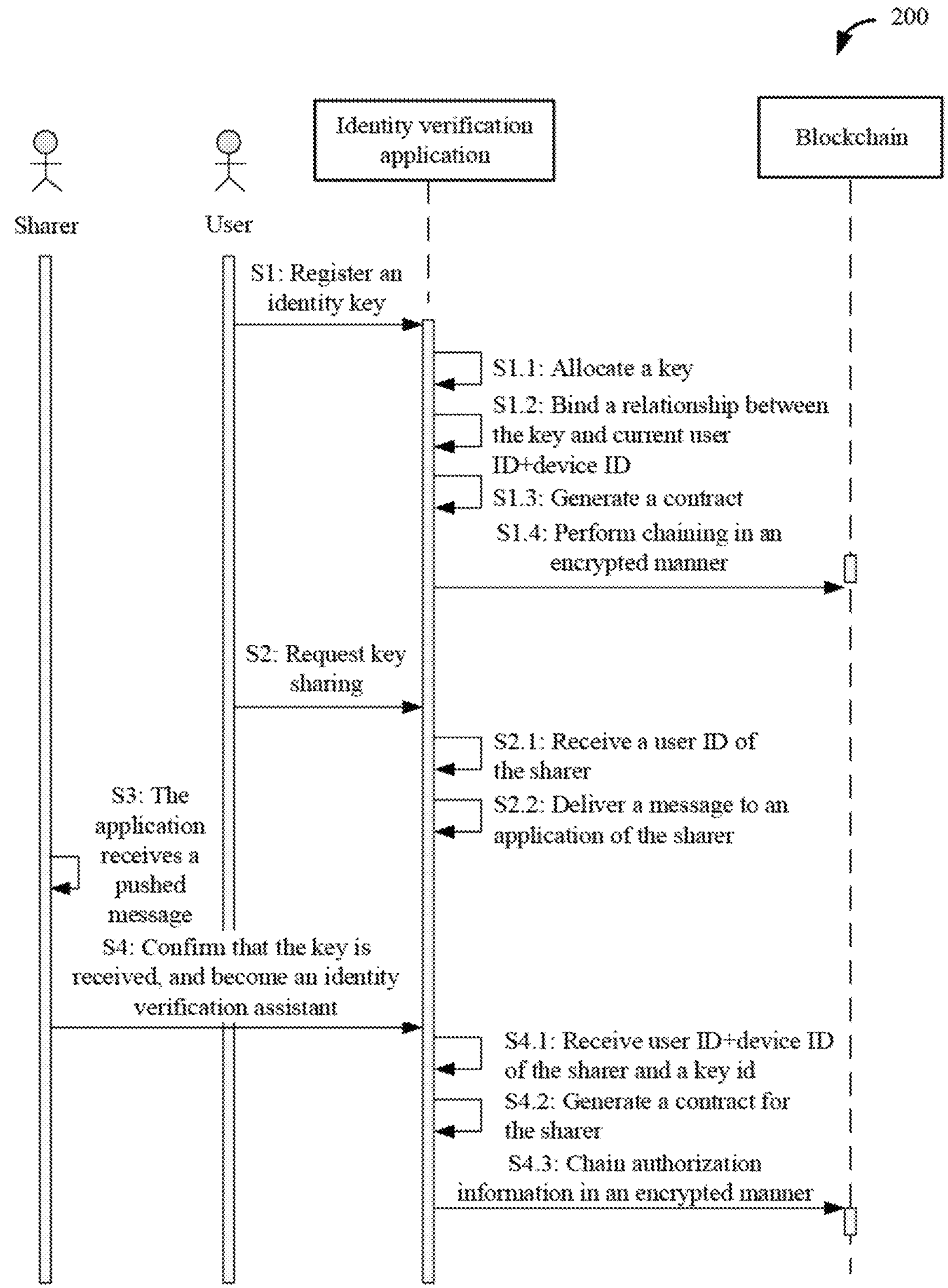
FIG. 2 is a schematic flowchart illustrating an identity key-based registration authorization procedure, according to an embodiment of the present disclosure.

FIG. 2 is a schematic flowchart illustrating an identity key-based registration authorization procedure 200, according to an embodiment of the present disclosure. In the present disclosure, multi-device assistive identity verification means that a plurality of devices need to be simultaneously involved. Because the device does not have an identity feature, a user needs to be guided to perform identity key registration and sharer authorization. The registration authorization procedure 200 includes the following steps.

S1: In an application, the user can first register a personal virtual identity key through strong authentication (a payment password or real person face scanning).

In an identity verification application, in response to step S1, the following operations are performed: S1.1: Allocate a unique key secretKey to an identity key in response to that the user requests to register the identity key. S1.2: Bind a relationship between the identity key and current user ID (uid)+device ID (deviceId). S1.3: Form the identity key and a binding relationship into a contract. S1.4: Store the identity key on a blockchain in an encrypted manner, so that the key is temper-resistant and traceable.

S2: The user (namely, a user owning the identity key) can further request key sharing, that is, allocation of the identity key to a family member or a trusted friend (namely, a sharer or an identity verification assistant) in a sharing manner.

In the identity verification application, in response to step S2, the following operations are performed: S2.1: Receive a user ID (uid) of the sharer in response to that the user requests key sharing. S2.2: Push a message to an application (app) of the sharer in response to that the user ID (uid) of the sharer is received.

S3: The application of the sharer subsequently receives the pushed message about key sharing.

S4: The sharer confirms that the key is received, and becomes an identity verification assistant.

In the identity verification application, in response to step S4, the following operations are performed: S4.1: Receive user ID (uid)+device ID (deviceId) of the sharer and a key id in response to that the sharer confirms that the key is received. S4.2: Generate a contract for authorization information of the sharer (that is, bind a relationship between the identity key and uid+deviceId of the sharer, to form a contract). S4.3: Chain the authorization information in an encrypted manner (that is, record, by using a contract, the authorization information on a blockchain to which a current key belongs).

The following two scenarios are considered. Scenario 1: A mother can allocate a key to a father, to avoid a case in which a child performs an operation such as game recharging when the mother takes no notice. Even if the child uses a mobile phone to directly face the mother, to complete facial verification, facial scanning verification, or fingerprint verification, payment cannot be completed when the father does not perform confirmation. Scenario 2: The aged can be helped by a child to register a key in advance, and then share the key with the child, to avoid a case in which the aged is induced to perform an identity verification operation, to complete obtaining of identity information or even a fund transfer-out without being conscious.

Therefore, in a service scenario in which a commodity purchase, a transfer, registration, etc. is performed, in addition to an identity verification manner that includes password verification, SMS message verification, biological verification, etc. and that is output by a normal service procedure, only an identity key needs to be output additionally, to complete assistive identity verification. In this way, a potential security risk of identity verification can be greatly reduced, and security of identity verification and user experience are improved. In addition, the identity key is stored on the blockchain, so that the key is temper-resistant, public, and traceable.

Figure 3:
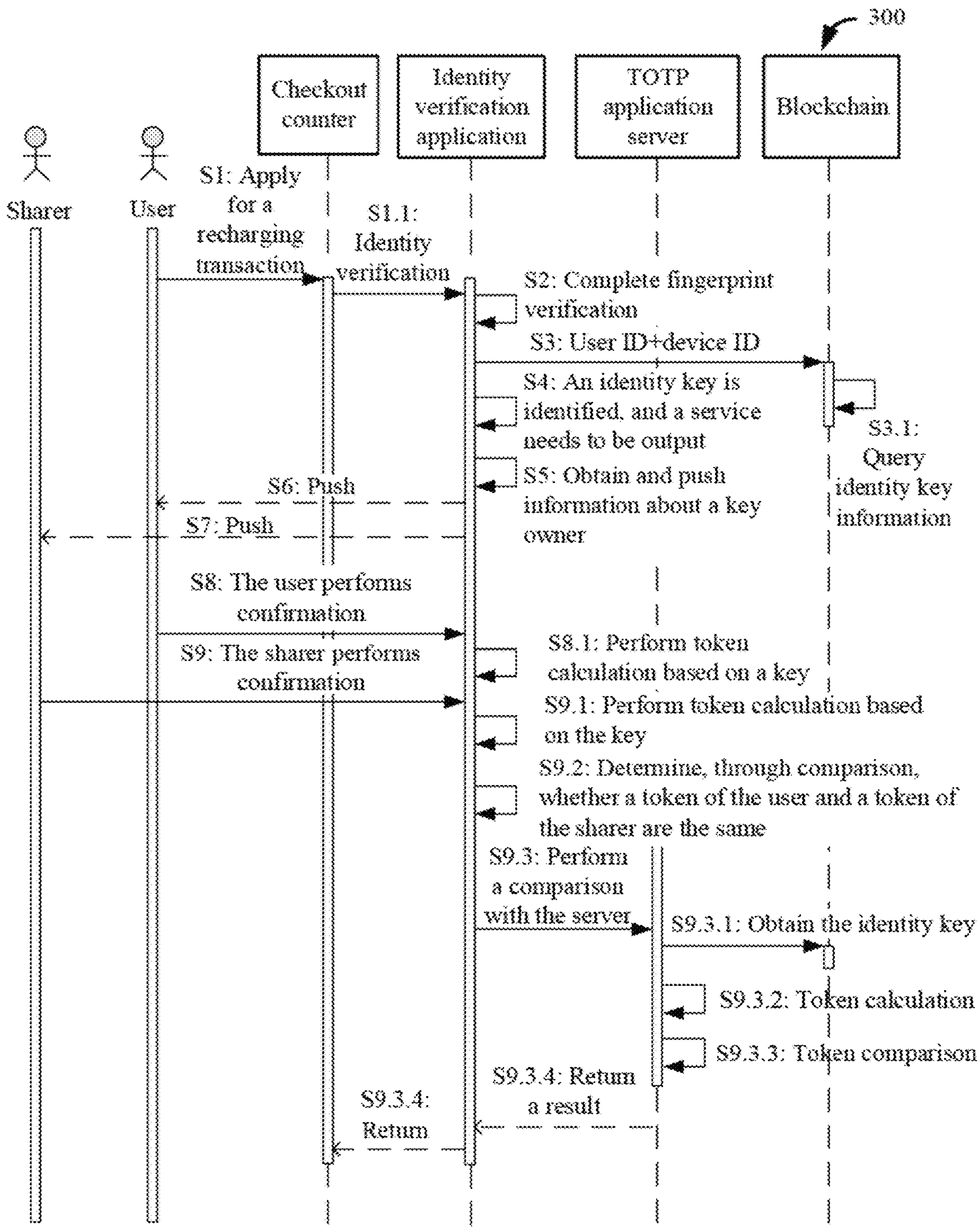
FIG. 3 is a schematic flowchart illustrating an identity key-based identity verification procedure, according to an embodiment of the present disclosure.

FIG. 3 is a schematic flowchart illustrating an identity key-based identity verification procedure 300, according to an embodiment of the present disclosure. It can be seen from FIG. 2 that, a user has completed identity key registration and sharer authorization by using the registration authorization procedure 200. An identity key allocated to the user, user information, and information about the sharer are bound together and stored on a blockchain in an encrypted manner. An identity verification procedure 300 in which the user applies for a recharging transaction includes the following steps.

S1: The user applies for the recharging transaction.

S1.1: At a checkout counter, perform identity verification in response to a recharging transaction request initiated by the user.

S2: Complete fingerprint verification (which can certainly be password verification, SMS message verification, or facial verification) in an identity verification application in response to identity verification.

S3: Obtain user ID (uid)+device ID (deviceId) of a current user.

S3.1: Query corresponding identity key information from the blockchain based on uid+deviceId of the current user.

S4: In the identity verification application, the identity key of the user is identified, and a service needs to be output.

S5: In the identity verification application, obtain information about key owners (namely, the current user and the sharer), and perform a confirmation push based on the obtained information (namely, uid+deviceId of the key owner).

S6: Perform a confirmation push to the user, to invite the user to send confirmation.

S7: Perform a confirmation push to the sharer, to invite the sharer to send confirmation.

S8: The user sends the confirmation.

S8.1: Perform token calculation based on a key secretKey and a TOTP algorithm in response to that the user sends the confirmation.

S9: The sharer sends the confirmation.

S9.1: Perform token calculation based on a key secretKey and the TOTP algorithm in response to that the sharer sends the confirmation. S9.2: Determine, through comparison, whether a token of the user and a token of the sharer are the same. S9.3: When a comparison result indicates that the token of the user and the token of the sharer are the same, further perform a comparison with a token calculated in a TOTP application server.

S9.3.1: In the TOTP application server, obtain an identity key secretKey from the blockchain based on uid+deviceId of the user. S9.3.2: Perform token calculation based on the obtained identity key secretKey and the TOTP algorithm. S9.3.3: Determine, through comparison, whether a token (namely, tokens calculated in steps S8.1 and S9.1) of a service request and a current token are the same. S9.3.4: Return an identity verification result to the identity verification application, where when the comparison result indicates that the token of the service request and the current token are the same, a result indicating that identity verification succeeds is returned to the identity verification application.

S9.4: Return to the checkout counter, to complete identity verification and enter a next service procedure.

Therefore, when a normal identity verification step is bypassed due to, for example, a similar face, in a process in which an operator verifies a key, direct interception is directly performed because user ID+device ID to which the key belongs does not match. In addition, when a personal operation or an acquaintance operation (as described in the two above-mentioned scenarios) are induced, an output of the identity key is an operation that can be continued only when all persons owning the key perform confirmation. It means that a current device and a device authorized to have the key simultaneously receive a key use confirmation push in an identity verification process, and identity verification can be considered as succeeding only after both of the current device and the device authorized to have the key complete confirmation operation (for example, in Scenario 1, identity verification can be completed only after a father assists in confirmation, or in Scenario 2, identity verification can be completed only after a child remotely assists in confirmation). In this way, a potential security risk of identity verification is significantly reduced, and security of identity verification is improved. This is merely used as an example to describe an identity verification procedure in which the user initiates the recharging transaction. However, a person skilled in the art can understand that the present disclosure is not limited to an identity verification procedure in the recharging transaction, and further includes an identity verification procedure in any other normal transaction request.

Figure 4:
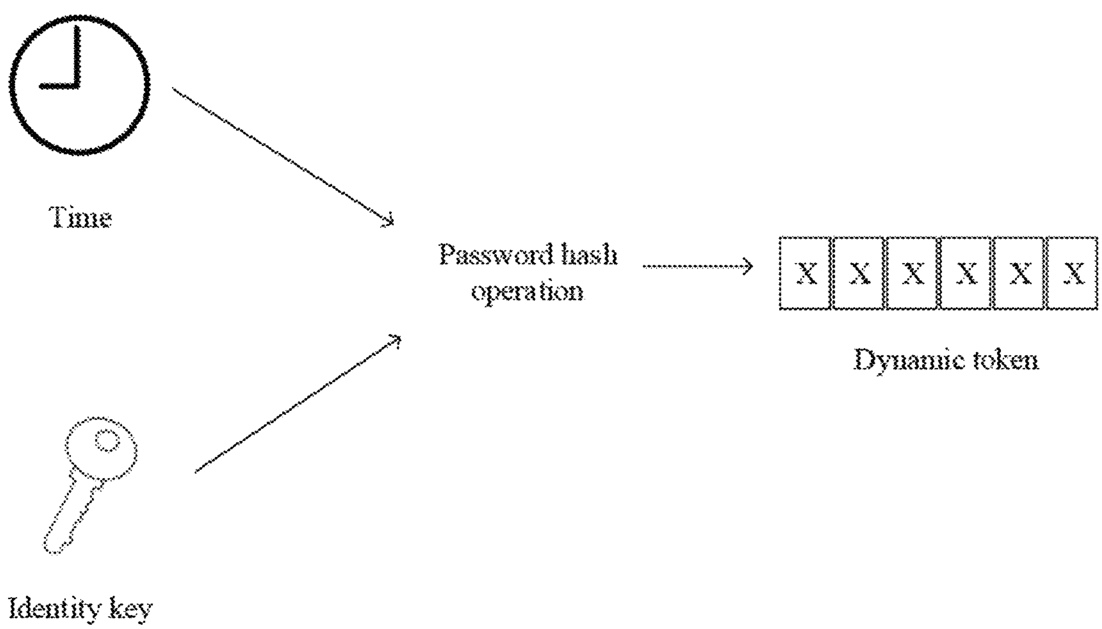
FIG. 4 is a schematic diagram illustrating calculating a dynamic token based on a time-based one-time password (TOTP) algorithm, according to an embodiment of the present disclosure.

FIG. 4 is a schematic diagram illustrating calculating a dynamic token based on a time-based one-time password (TOTP) algorithm, according to an embodiment of the present disclosure; The TOTP algorithm is used, and provided that a client (a proof party) and a server (a verification party) keep clocks consistent, and a shared key is preset for the two parties, the same value is calculated in the same time period. A TOTP is calculated based on the following formula: TOTP=Truncate(HMAC−SHA−1(K, T)). Here, T is determined by a current time CurrentUnixTime, an initial time (T0), and a step length (X). That is, T=(CurrentUnixtime−T0)/X. Here, CurrentUnixtime is a current Unix time, T0 is an initial time at which a step count is started, and X is a step length.

Based on such a principle, as shown in FIG. 4, a user identity is first bound to the shared key. In a subsequent authentication process, the client and the server respectively calculate dynamic tokens (for example, 6-bit check codes) based on the obtained shared key (for example, the identity key in the present disclosure), a current timestamp, the same Hash algorithm, and the TOTP algorithm, and identity verification can succeed provided that it is determined through comparison that the dynamic tokens are consistent. The TOTP can be calculated online or offline on a terminal. It is very flexible.

Figure 5:
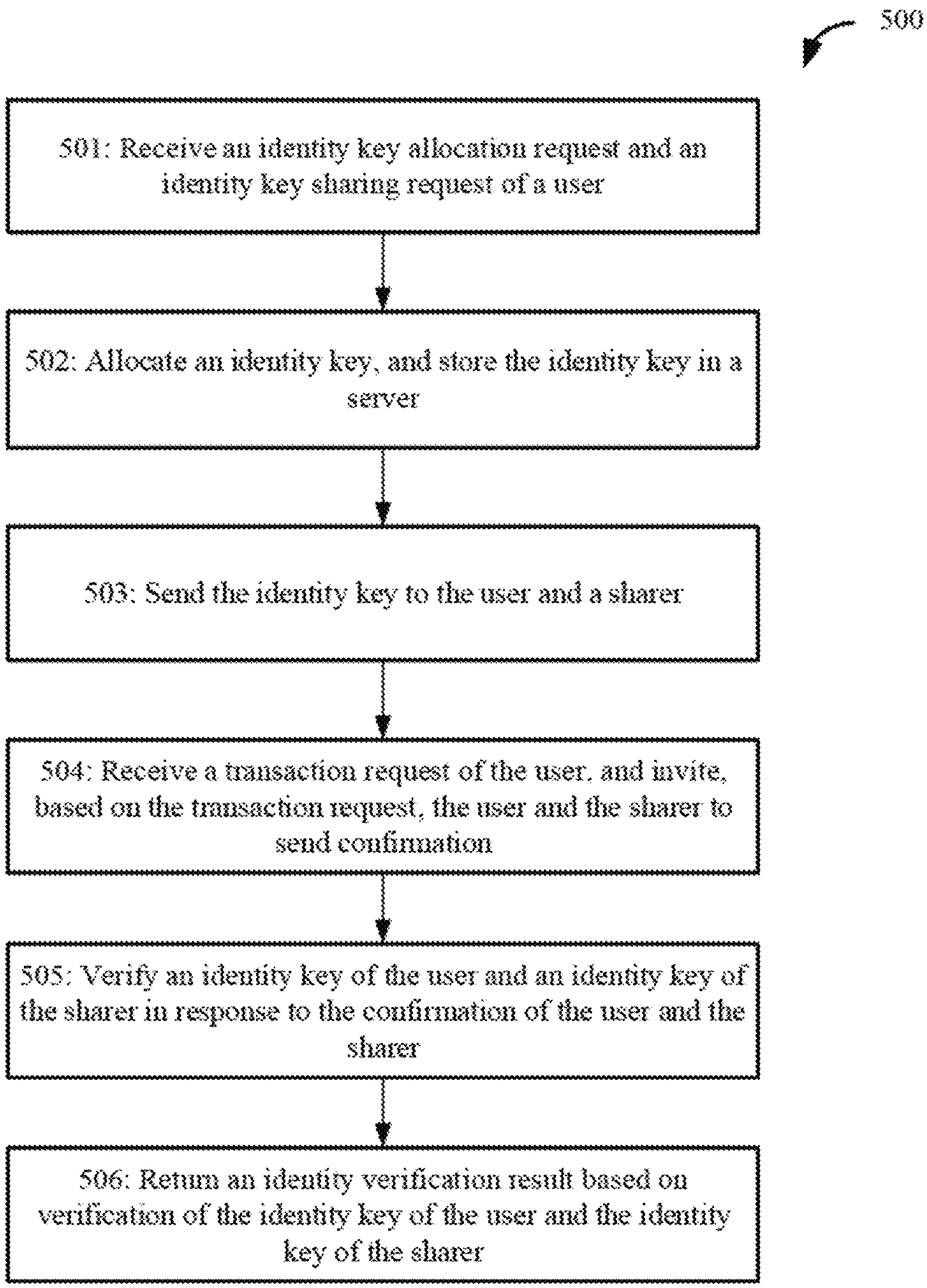
FIG. 5 is a schematic flowchart illustrating a multi-device assistive identity verification method, according to an embodiment of the present disclosure.

FIG. 5 is a schematic flowchart illustrating a multi-device assistive identity verification method 500, according to an embodiment of the present disclosure. The method 500 starts from step 501: A key allocation module 101 can receive an identity key allocation request and an identity key sharing request of a user.

Step 502: The key allocation module 101 can allocate an identity key, and store the identity key in a server. In an implementation, the key allocation module 101 can store the allocated identity key on a blockchain in an encrypted manner, so that the key is temper-resistant, public, and traceable. In an implementation, the key allocation module 101 can bind the allocated identity key to a user identifier and a device identifier of the user and a user identifier and a device identifier of a sharer, to form a contract. Preferably, the key allocation module 101 can bind the identity key to information about the user and the sharer, to form a contract, and then chain the identity key to information about the user and the sharer in an encrypted manner.

Step 503: The key allocation module 101 can send the identity key to the user and the sharer.

Step 504: An assistive confirmation module 102 can receive a transaction request of the user, and invite, based on the transaction request, the user and the sharer to send confirmation. In an implementation, the assistive confirmation module can receive the transaction request of the user, and based on the transaction request, obtain the corresponding identity key from the blockchain based on the user identifier and the device identifier of the user, and invite the user and the sharer bound to the obtained identity key to send confirmation. In an implementation, in response to that the transaction request of the user is received, the assistive confirmation module can perform password verification, SMS message verification, or biometric verification before inviting the user and the sharer to send the confirmation.

Step 505: An identity verification module 103 can verify an identity key of the user and an identity key of the sharer in response to the confirmation of the user and the sharer. In an implementation, the identity verification module 103 can separately calculate a token of the user and a token of the sharer, and compare the token of the user and the token of the sharer. The token can be calculated based on a time-based one-time password (TOTP) algorithm and based on the identity key and a current timestamp, as described in FIG. 4. Then, the identity verification module 103 can obtain, based on a comparison result indicating that the token of the user and the token of the sharer are the same, a token calculated in the server. In an implementation, the token calculated in the server is calculated in the server based on an identity key obtained from the blockchain. Subsequently, the identity verification module 103 can further compare the token of the user and the token obtained from the server.

Step 506: The identity verification module 103 can return an identity verification result based on verification of the identity key of the user and the identity key of the sharer. In an implementation, the identity verification module 103 can return, based on a comparison result indicating that the token of the user and the token obtained from the server are the same, a result indicating that identity verification succeeds, and continue to advance a normal service procedure. In another implementation, the identity verification module 103 can return, based on a comparison result indicating that the token of the user and the token obtained from the server are different, a result indicating that identity verification fails, and intercept a next operation.

Therefore, when a user initiates a transaction request, an identity verification assistant authorized by the user is requested to simultaneously perform confirmation to complete assistive identity verification. In this way, a potential security risk such as a similar face is avoided based on an identity verification solution in which multi-device assistive interaction is performed, and security of identity verification is improved.

Figure 6:
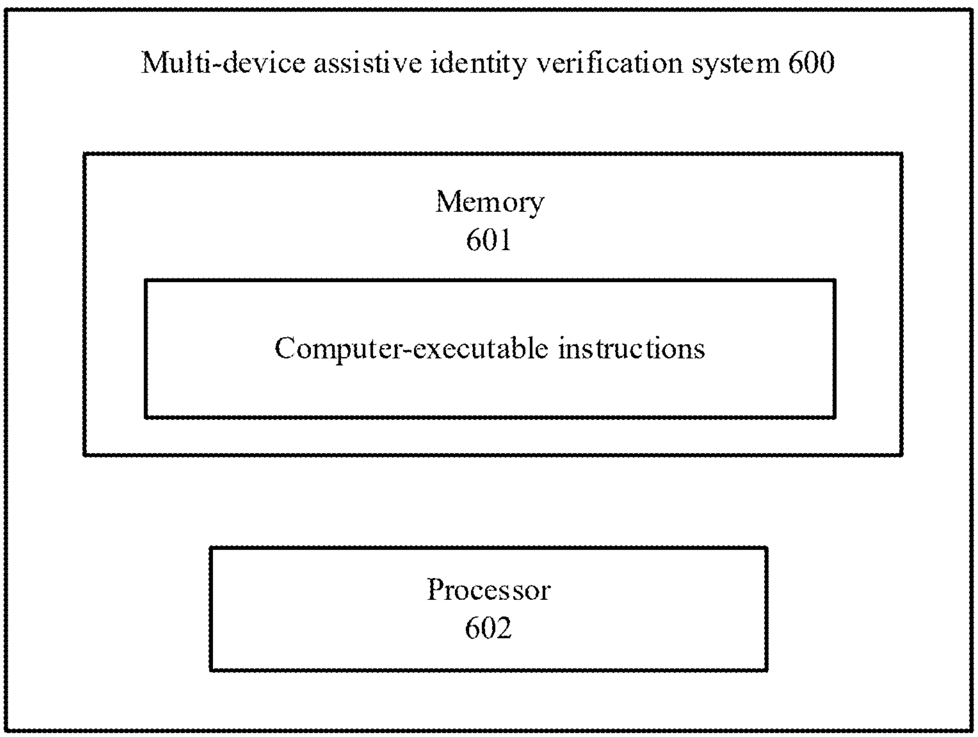
FIG. 6 is a schematic architectural diagram illustrating a multi-device assistive identity verification system, according to an embodiment of the present disclosure.

FIG. 6 is a schematic architectural diagram illustrating a multi-device assistive identity verification system 600, according to an embodiment of the present disclosure. As shown in FIG. 6, the system 600 can include a memory 601 and at least one processor 602. The memory 601 can include a RAM, a ROM, or a combination thereof. The memory 601 can store computer-executable instructions, and when the instructions are executed by the at least one processor 602, the at least one processor 602 is enabled to perform various functions described in this specification, including: receiving an identity key allocation request and an identity key sharing request of a user; allocating an identity key, and storing the identity key in a server; sending the identity key to the user and a sharer; receiving a transaction request of the user, and inviting, based on the transaction request, the user and the sharer to send confirmation; in response to the confirmation of the user and the sharer, separately calculating a token of the user and a token of the sharer, and comparing the token of the user and the token of the sharer; obtaining, based on a comparison result indicating that the token of the user and the token of the sharer are the same, a token calculated in the server; further comparing the token of the user and the token obtained from the server; and returning an identity verification result based on a further comparison result. In some cases, the memory 601 can particularly include a BIOS, and the BIOS can control basic hardware or software operations such as interaction with a peripheral component or device. The processor 602 can include a smart hardware device (for example, a general-purpose processor, a DSP, a CPU, a microcontroller, an ASIC, an FPGA, a programmable logic device, a discrete gate or transistor logic component, a discrete hardware component, or any combination thereof).

Various illustrative boxes and modules disclosed in this specification can be implemented or executed by a general-purpose processor, a DSP, an ASIC, an FPGA or another programmable logic device, a discrete gate or transistor logic component, a discrete hardware component, or any combination thereof designed to perform the functions described in this specification. The general-purpose processor can be a microprocessor, but in an alternative solution, the processor can be any conventional processor, controller, microcontroller, or state machine. The processor can also be implemented as a combination of computing devices (for example, a combination of a DSP and a microprocessor, a plurality of microprocessors, one or more microprocessors that cooperate with a core of a DSP, or any other such configuration).

The functions described in this specification can be implemented in hardware, software executed by the processor, firmware, or any combination thereof. If the functions are implemented in software executed by the processor, the functions can be stored as one or more instructions or code on a computer-readable medium or transmitted through a computer-readable medium. Other examples and implementations fall within the scope of the present disclosure and the appended claims. For example, due to the nature of software, the functions described in this specification can be implemented by using software executed by the processor, hardware, firmware, a hard link, or any combination thereof. Features that implement the functions can also be physically located at various locations, including being distributed, so that parts of the functions are implemented at different physical locations.

The content described above includes examples of aspects of the claimed subject matter. Certainly, it is impossible to describe a combination of components or methods that can be contemplated for the purpose of describing the claimed subject matter, but those of ordinary skill in the art should recognize that many further combinations and arrangements of the claimed subject matter are possible. Therefore, the disclosed subject matter is intended to cover all such changes, modifications, and variations that fall within the spirit and scope of the appended claims.

What is claimed is:

1. A multi-device assistive identity verification method, wherein the method comprises:

receiving an identity key allocation request and an identity key sharing request of a user;

allocating, in response to the identity key allocation request, an identity key for the user, and storing the identity key in a server, wherein the allocated identity key is bound to a user identifier and a device identifier of the user and a user identifier and a device identifier of a sharer, to form a contract;
sending the identity key to the user and the sharer;
receiving a transaction request of the user, and inviting, based on the transaction request, the user and the sharer to send confirmation;
in response to the confirmation of the user and the sharer, separately calculating a first token of the user and a second token of the sharer based on a time-based one-time password (TOTP) algorithm, the identity key and a current timestamp;
comparing the first token and the second token;
in response to determining that the first token and the second token are the same, obtaining a third token calculated by a server;
comparing the first token and the third token; and
returning an identity verification result based on the comparison of the first token and the third token.

2. The method according to claim 1, wherein the allocated identity key is stored on a blockchain in an encrypted manner.

3. The method according to claim 2, wherein inviting, based on the transaction request, the user and the sharer to send confirmation further comprises:
obtaining a corresponding identity key from the blockchain based on the transaction request and the user identifier and the device identifier of the user; and
inviting the user and the sharer bound to the obtained identity key to send the confirmation.

4. The method according to claim 1, wherein the third token calculated in the server is calculated in the server based on an identity key obtained from a blockchain.

5. The method according to claim 1, further comprising:
in response to that the transaction request of the user is received, performing password verification, SMS message verification, or biometric verification before inviting the user and the sharer to send confirmation.

6. A non-transitory computer-readable storage medium storing instructions which when executed by a processor, cause the processor to:
receive an identity key allocation request and an identity key sharing request of a user;
allocate, in response to the identity key allocation request, an identity key for the user, and store the identity key in a server, wherein the allocated identity key is bound to a user identifier and a device identifier of the user and a user identifier and a device identifier of a sharer, to form a contract;
send the identity key to the user and the sharer;
receive a transaction request of the user, and inviting, based on the transaction request, the user and the sharer to send confirmation;
in response to the confirmation of the user and the sharer, separately calculate a first token of the user and a second token of the sharer based on a time-based one-time password (TOTP) algorithm, the identity key and a current timestamp;
compare the first token and the second token;
in response to determining that the first token and the second token are the same, obtain a third token calculated by a server;
compare the first token and the third token; and
return an identity verification result based on the comparison of the first token and the third token.

7. The non-transitory computer-readable storage medium according to claim 6, wherein the allocated identity key is stored on a blockchain in an encrypted manner.

8. The non-transitory computer-readable storage medium according to claim 7, wherein the processor being caused to invite, based on the transaction request, the user and the sharer to send confirmation further comprises being caused to:
obtain a corresponding identity key from the blockchain based on the transaction request and the user identifier and the device identifier of the user; and
invite the user and the sharer bound to the obtained identity key to send the confirmation.

9. The non-transitory computer-readable storage medium according to claim 6, wherein the third token calculated in the server is calculated in the server based on an identity key obtained from a blockchain.

10. The non-transitory computer-readable storage medium according to claim 6, wherein the processor further comprises being caused to:
in response to that the transaction request of the user is received, perform password verification, SMS message verification, or biometric verification before inviting the user and the sharer to send confirmation.

11. A computing device, comprising a memory and a processor, wherein the memory stores executable code, and wherein the processor is configured to execute the executable code to cause the computing device to:
receive an identity key allocation request and an identity key sharing request of a user;
allocate, in response to the identity key allocation request, an identity key for the user, and store the identity key in a server, wherein the allocated identity key is bound to a user identifier and a device identifier of the user and a user identifier and a device identifier of a sharer, to form a contract;
send the identity key to the user and the sharer;
receive a transaction request of the user, and inviting, based on the transaction request, the user and the sharer to send confirmation;
in response to the confirmation of the user and the sharer, separately calculate a first token of the user and a second token of the sharer based on a time-based one-time password (TOTP) algorithm, the identity key and a current timestamp;
compare the first token and the second token;
in response to determining that the first token and the second token are the same, obtain a third token calculated by a server;
compare the first token and the third token; and
return an identity verification result based on the comparison of the first token and the third token.

12. The computing device according to claim 11, wherein the allocated identity key is stored on a blockchain in an encrypted manner.

13. The computing device according to claim 12, wherein the computing device being caused to invite, based on the transaction request, the user and the sharer to send confirmation further comprises being caused to:
obtain a corresponding identity key from the blockchain based on the transaction request and the user identifier and the device identifier of the user; and
invite the user and the sharer bound to the obtained identity key to send the confirmation.

* * * * *